(12) United States Patent
Park et al.

(10) Patent No.: US 12,451,540 B2
(45) Date of Patent: Oct. 21, 2025

(54) BATTERY MODULE AND BATTERY PACK INCLUDING THE SAME

(71) Applicant: LG Energy Solution, Ltd., Seoul (KR)

(72) Inventors: Subin Park, Daejeon (KR); Junyeob Seong, Daejeon (KR); Won Kyoung Park, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 18/909,579

(22) Filed: Oct. 8, 2024

(65) Prior Publication Data

US 2025/0030083 A1    Jan. 23, 2025

Related U.S. Application Data

(63) Continuation of application No. 17/926,062, filed as application No. PCT/KR2021/002278 on Feb. 24, 2021.

(30) Foreign Application Priority Data

Jun. 26, 2020    (KR) ........................ 10-2020-0078511

(51) Int. Cl.
*H01M 10/653* (2014.01)
*H01M 10/613* (2014.01)
*H01M 10/625* (2014.01)
*H01M 10/6551* (2014.01)
*H01M 50/204* (2021.01)

(52) U.S. Cl.
CPC ....... *H01M 10/653* (2015.04); *H01M 10/613* (2015.04); *H01M 10/625* (2015.04); *H01M 10/6551* (2015.04); *H01M 50/204* (2021.01)

(58) Field of Classification Search
CPC ............. H01M 10/653; H01M 10/613; H01M 10/625; H01M 10/6551
See application file for complete search history.

(56) References Cited

U.S. PATENT DOCUMENTS

| | | | |
|---|---|---|---|
| 2011/0059347 A1 | 3/2011 | Lee et al. | |
| 2012/0009455 A1 | 1/2012 | Yoon | |
| 2012/0298433 A1 | 11/2012 | Ohkura | |
| 2014/0023906 A1* | 1/2014 | Hashimoto | ......... H01M 10/625 429/157 |
| 2014/0087231 A1 | 3/2014 | Schaefer et al. | |
| 2015/0260091 A1* | 9/2015 | Hsieh | ........................ F01C 1/22 165/51 |
| 2016/0072164 A1* | 3/2016 | Jung | ................. H01M 10/6555 429/120 |
| 2016/0087319 A1 | 3/2016 | Roh et al. | |
| 2017/0365888 A1* | 12/2017 | Kwon | ............... H01M 10/4207 |
| 2018/0062225 A1 | 3/2018 | You et al. | |
| 2018/0183119 A1 | 6/2018 | Ju et al. | |
| 2019/0131678 A1 | 5/2019 | Kim et al. | |
| 2019/0221904 A1 | 7/2019 | Fujii | |
| 2019/0267591 A1 | 8/2019 | Park et al. | |
| 2020/0067040 A1 | 2/2020 | Kim et al. | |
| 2020/0106058 A1 | 4/2020 | Kim | |
| 2020/0203784 A1 | 6/2020 | Shimizu et al. | |
| 2020/0220124 A1 | 7/2020 | Park et al. | |
| 2020/0350645 A1 | 11/2020 | Ju et al. | |
| 2020/0358057 A1 | 11/2020 | Lindstrom | |
| 2020/0411924 A1 | 12/2020 | Yun | |
| 2021/0016668 A1* | 1/2021 | Nakahara | ............ H01M 50/209 |
| 2021/0036277 A1 | 2/2021 | Seo et al. | |
| 2021/0175572 A1* | 6/2021 | He | ....................... H01M 10/613 |
| 2021/0218100 A1 | 7/2021 | Shao et al. | |

FOREIGN PATENT DOCUMENTS

| | | |
|---|---|---|
| CN | 102356505 A | 2/2012 |
| CN | 104981937 A | 10/2015 |
| CN | 105703038 A | 6/2016 |
| CN | 107528019 A | 12/2017 |
| CN | 108666494 A | 10/2018 |
| JP | 2007-273149 A | 10/2007 |
| JP | 2011023296 A | 2/2011 |
| JP | 2012018915 A | 1/2012 |
| JP | 2012248299 A | 12/2012 |
| JP | 2012248374 A | 12/2012 |
| JP | 2016511509 A | 4/2016 |
| JP | 2018116805 A | 7/2018 |
| JP | 2019071261 A | 5/2019 |
| JP | 2019514192 A | 5/2019 |
| KR | 2014-0016326 A | 2/2014 |
| KR | 2014-0143854 A | 12/2014 |
| KR | 2015-0100529 A | 9/2015 |
| KR | 2017-0029283 A | 3/2017 |
| KR | 2017-0034775 A | 3/2017 |
| KR | 2017-0142448 A | 12/2017 |
| KR | 2019-0120154 A | 10/2019 |
| KR | 2020-0021609 A | 3/2020 |
| WO | 2019177275 A1 | 9/2019 |

OTHER PUBLICATIONS

Extended European Search Report including Written Opinion for Application No. 21828187.1 dated Sep. 12, 2024, pp. 1-7.
Search Report dated May 27, 2025 from the Office Action for Chinese Application No. 202180037652.0 Issued May 28, 2025, pp. 1-3.

* cited by examiner

*Primary Examiner* — Muhammad S Siddiquee

(74) *Attorney, Agent, or Firm* — Lerner David LLP (57) ABSTRACT

The battery pack according to one embodiment of the present disclosure includes: a lower pack housing including a plurality of module regions; a thermally conductive resin layer located in the module region; a battery module mounted on the module region and located on the thermally conductive resin layer; and an upper pack housing for covering the battery module, wherein the battery module comprises a battery cell stack in which a plurality of battery cells are stacked, and the battery cell stack directly faces the thermally conductive resin layer, wherein the battery cell stack includes cooling fins located between battery cells adjacent to each other among the plurality of battery cells, and wherein the end portion of the cooling fin comes into contact with the thermally conductive resin layer.

25 Claims, 11 Drawing Sheets

BATTERY MODULE AND BATTERY PACK INCLUDING THE SAME

CROSS-REFERENCE TO RELATED APPLICATIONS

This application is a continuation of U.S. application Ser. No. 17/926,062, filed on Nov. 17, 2022, which is a national phase entry under 35 U.S.C. § 371 of International Application No. PCT/KR2021/002278, filed Feb. 24, 2021, which claims the benefit of Korean Patent Application No. 10-2020-0078511 filed on Jun. 26, 2020 in the Korean Intellectual Property Office, the disclosure of which is incorporated herein by reference in its entirety.

TECHNICAL FIELD

The present disclosure relates to a battery module and a battery pack including the same, and more particularly, to a battery module having improved cooling performance and a battery pack including the same

BACKGROUND ART

As technology development and demands for mobile devices increase, the demand for batteries as energy sources is rapidly increasing. In particular, a secondary battery has attracted considerable attention as an energy source for power-driven devices, such as an electric bicycle, an electric vehicle, and a hybrid electric vehicle, as well as an energy source for mobile devices, such as a mobile phone, a digital camera, a laptop computer and a wearable device.

Small-sized mobile devices use one or several battery cells for each device, whereas middle- or large-sized devices such as vehicles require high power and large capacity. Therefore, a middle or large-sized battery module in which a large number of battery cells are electrically connected is used.

Preferably, the middle or large-sized battery module is manufactured so as to have as small a size and weight as possible. For this reason, a prismatic battery, a pouch-type battery or the like, which can be stacked with high integration and has a small weight to capacity ratio, is usually used as a battery cell of the middle or large-sized battery module. Meanwhile, in order to protect the battery cell stack from external impact, heat or vibration, the battery module may include a module frame in which a front surface and rear surface are opened to house the battery cell stack in an internal space.

Figure 1:
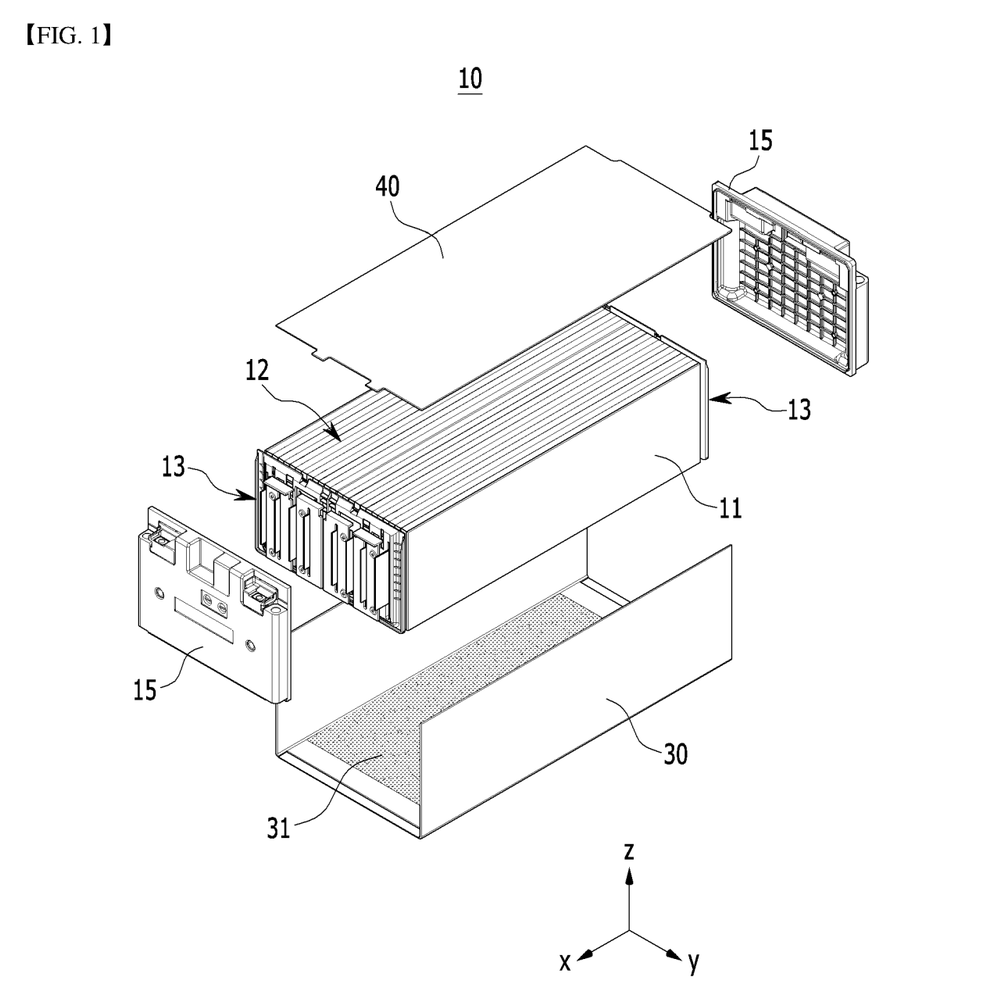
FIG. 1 is an exploded perspective view of a conventional battery module.
Figure 2:
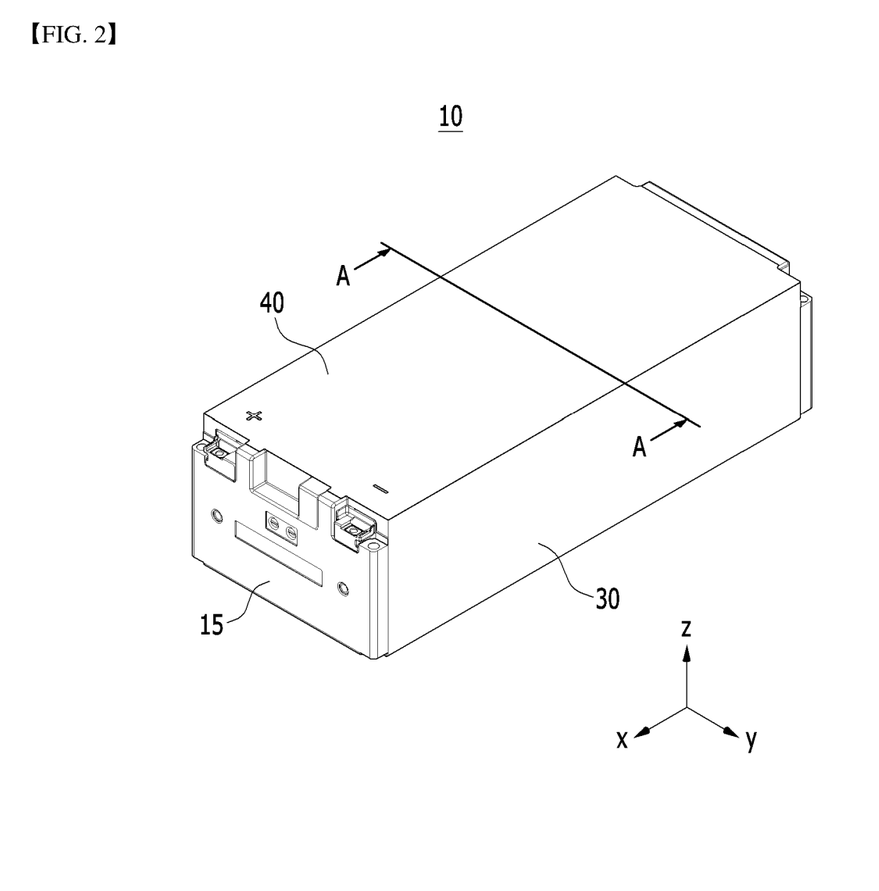
FIG. 2 is a perspective view showing a state in which the components constituting the battery module of FIG. 1 are combined.
Figure 3:
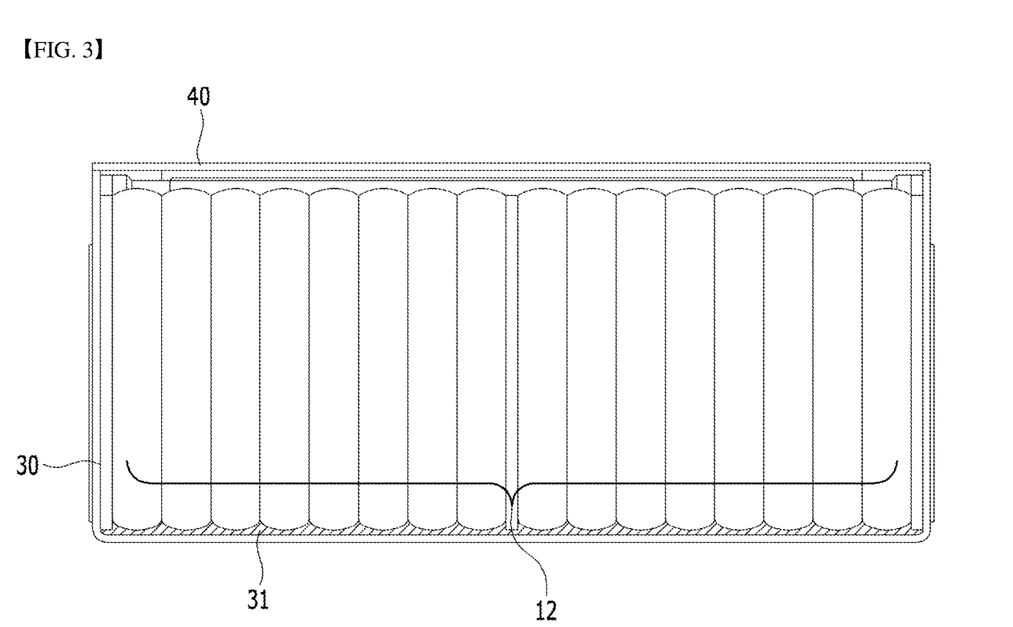
FIG. 3 is a cross-sectional view taken along the cutting line A-A of FIG. 2.

FIG. 1 is an exploded perspective view of a conventional battery module. FIG. 2 is a perspective view showing a state in which the components constituting the battery module of FIG. 1 are combined. FIG. 3 is a cross-sectional view taken along the cutting line A-A of FIG. 2.

Referring to FIGS. 1 to 3, the conventional battery module 10 includes a battery cell stack 12 in which a plurality of battery cells 11 are stacked in one direction, a module frame 20 for housing the battery cell stack 12, an end plate 15 for covering the front and rear surfaces of the battery cell stack, and busbar frames 13 formed between the end plate 15 and the front and rear surfaces of the battery cell stack 12. The module frame 20 includes a lower frame 30 for covering the lower and both side surfaces of the battery cell stack 12, and an upper plate 40 for covering the upper surface of the battery cell stack 12. The battery module 10 can cool heat generated in the battery cell stack 12 because a thermally conductive resin layer 31 is coated onto the bottom surface of the lower frame 30 that covers the lower portion of the battery cell stack 120.

At this time, the thermally conductive resin layer 31 transfers heat generated in the battery cell stack 12 to the outside of the battery module 10. However, in this case, as heat generated in the battery cell stack 12 is transferred in the order of the thermally conductive resin layer 31, the lower frame 30, and a heat sink (not shown) located on the lower surface of the lower frame 30, the battery cell stack 12 is indirectly cooled. Further, since there is no separate cooling means for each of the battery cells of the battery cell stack 12, the cooling deviation between the battery cells becomes severe. In particular, the outermost battery cell of the battery cell stack 12 is located on the outer side compared to the center battery cell to thereby reduce the heat transfer path, whereby the conventional battery module 10 leads to the severity of the cooling deviation between the outermost battery cells and the central battery cells.

In particular, considering that the temperature of the battery cell 11 is one of the factors that limits the output of the battery, the severity of the cooling deviation between the battery cells 11 generated in the battery cell stack 12 is highly likely to limit the output of the battery in an earlier stage and thus, there is a need to improve the above.

SUMMARY

Technical Problem

It is an object of the present disclosure to provide having improved cooling performance and a battery pack including the same.

The objects of the present disclosure are not limited to the aforementioned objects, and other objects which are not described herein should be clearly understood by those skilled in the art from the following detailed description and the accompanying drawings.

Technical Solution

According to one embodiment of the present disclosure, there is provided a battery pack comprising: a lower pack housing including a plurality of module regions; a thermally conductive resin layer located in the module region; a battery module mounted on the module region and located on the thermally conductive resin layer; and an upper pack housing for covering the battery module, wherein the battery module includes a battery cell stack in which a plurality of battery cells are stacked, and the battery cell stack directly faces the thermally conductive resin layer, wherein the battery cell stack includes cooling fins located between battery cells adjacent to each other among the plurality of battery cells, and wherein the end portion of the cooling fin comes into contact with the thermally conductive resin layer.

The upper and lower surfaces and both side surfaces of the battery cell stack included in the battery module includes exposed areas, the lower surface of the battery cell among the exposed areas stack faces the thermally conductive resin layer, and a direction in which the lower surface of the battery cell stack faces the thermally conductive resin layer, and a direction in which the battery cells are stacked may be perpendicular to each other.

The battery pack further includes at least one adhesive layer located between the cooling fin and the battery cell, and the both side surfaces of the cooling fin may be fixed to the battery cell by the adhesive layer.

The adhesive layer includes at least one stripe-shaped adhesive portion, and the adhesive portion may extend in a direction perpendicular to the stacking direction of the battery cell stack.

The end portion of the cooling fin may be fixed to the thermally conductive resin layer.

The battery pack according to claim 3,

The battery module may further include fixing members located at both end portions of the battery cell stack.

The fixing member may surround four surfaces of the battery cell stack.

The fixing member may be arranged along the end portion of the battery cell spaced apart from the adhesive layer.

The cooling fin may be a plate material including aluminum.

The battery module is mounted on the thermally conductive resin layer, before the thermally conductive resin forming the thermally conductive resin layer is cured, so that the end portion of the cooling fin comes into contact with the upper surface of the thermally conductive resin layer.

The battery pack may further include a plurality of partition walls partitioning the module region, and a surface of an outermost battery cell among battery cells included in the battery cell stack and the partition wall may face each other.

The density of the cooling fins formed on the outer peripheral portion of the battery cell stack is higher than the density of the cooling fins formed in the central portion of the battery cell stack.

According to another embodiment of the present disclosure, there is provided a device comprising the above-mentioned battery pack.

Advantageous Effects

According to the embodiments of the present disclosure, the battery module in which at least a part of the outer surface of the battery cell stack is exposed can be mounted on the pack housing, and the battery module includes a cooling fin located between the battery cell stack and at least two battery cells adjacent to each other, thereby capable of reducing a temperature difference between battery cells in a battery cell stack included in the battery module.

The effects of the present disclosure are not limited to the effects mentioned above and additional other effects not described above will be clearly understood from the description of the appended claims by those skilled in the art.

DETAILED DESCRIPTION

Hereinafter, various embodiments of the present disclosure will be described in detail with reference to the accompanying drawings so that those skilled in the art can easily implement them. The present disclosure may be modified in various different ways, and is not limited to the embodiments set forth herein.

Portions that are irrelevant to the description will be omitted to clearly describe the present disclosure, and like reference numerals designate like elements throughout the specification.

Further, in the figures, the size and thickness of each element are arbitrarily illustrated for convenience of description, and the present disclosure is not necessarily limited to those illustrated in the figures. In the figures, the thickness of layers, areas, etc. are exaggerated for clarity. In the figures, for convenience of description, the thicknesses of some layers and areas are shown to be exaggerated.

Further, throughout the specification, when a portion is referred to as "including" a certain component, it means that the portion can further include other components, without excluding the other components, unless otherwise stated.

Further, throughout the specification, when referred to as "planar", it means when a target portion is viewed from the upper side, and when referred to as "cross-sectional", it means when a target portion is viewed from the side of a cross section cut vertically.

In the following, the battery pack according to an embodiment of the present disclosure will be described. However, the description herein is made based on the front surface of the front and rear surfaces of the battery pack, without being limited thereto, and even in the case of the rear surface, the same or similar contents may be described.

Figure 4:
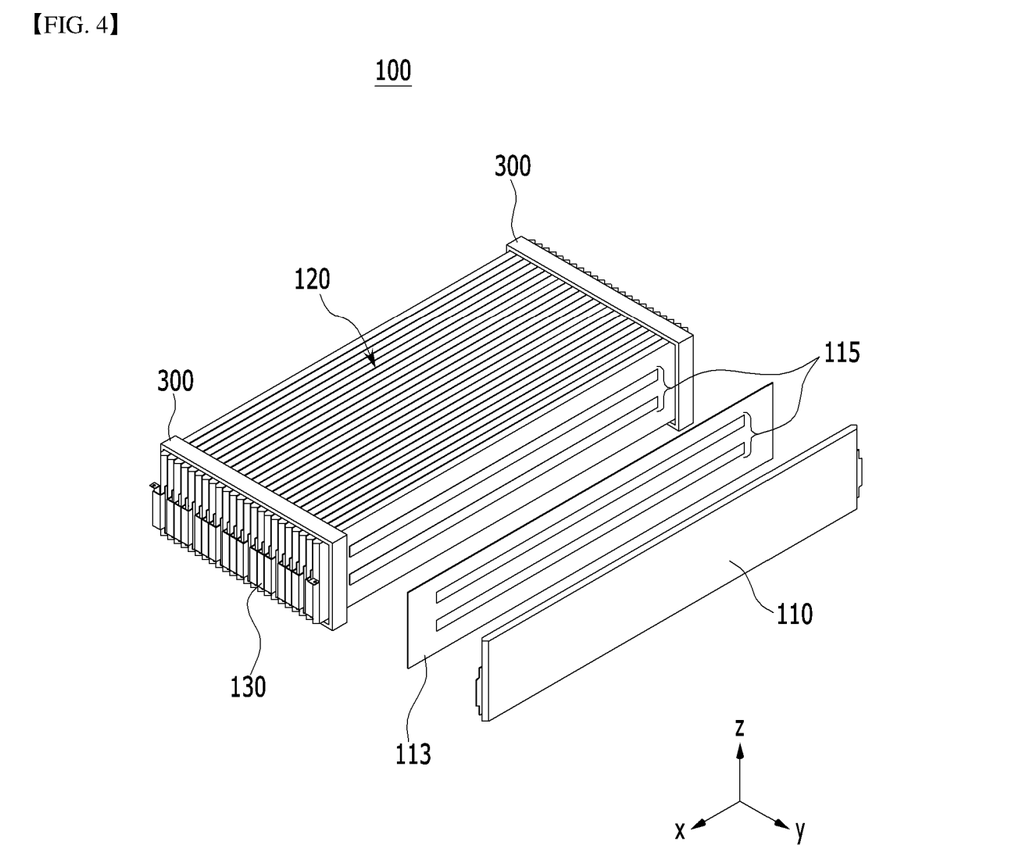
FIG. 4 is an exploded perspective view of a battery module according to an embodiment of the present disclosure.
Figure 5:
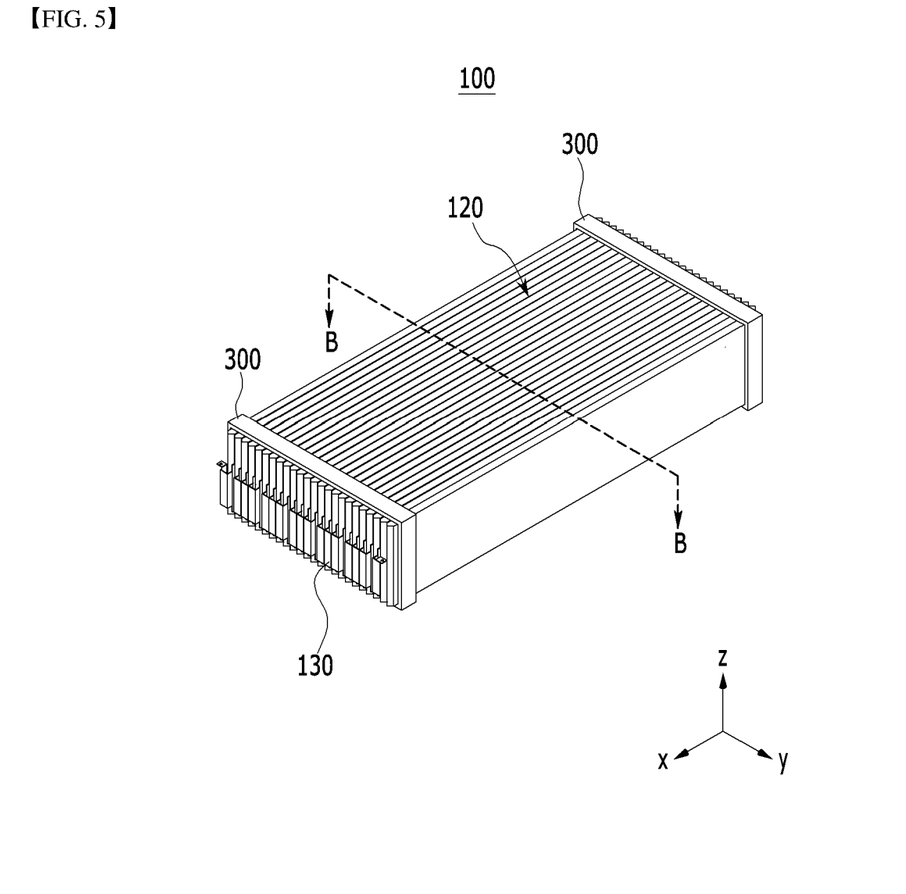
FIG. 5 is a perspective view showing a state in which the components constituting the battery module of FIG. 4 are combined.
Figure 6:
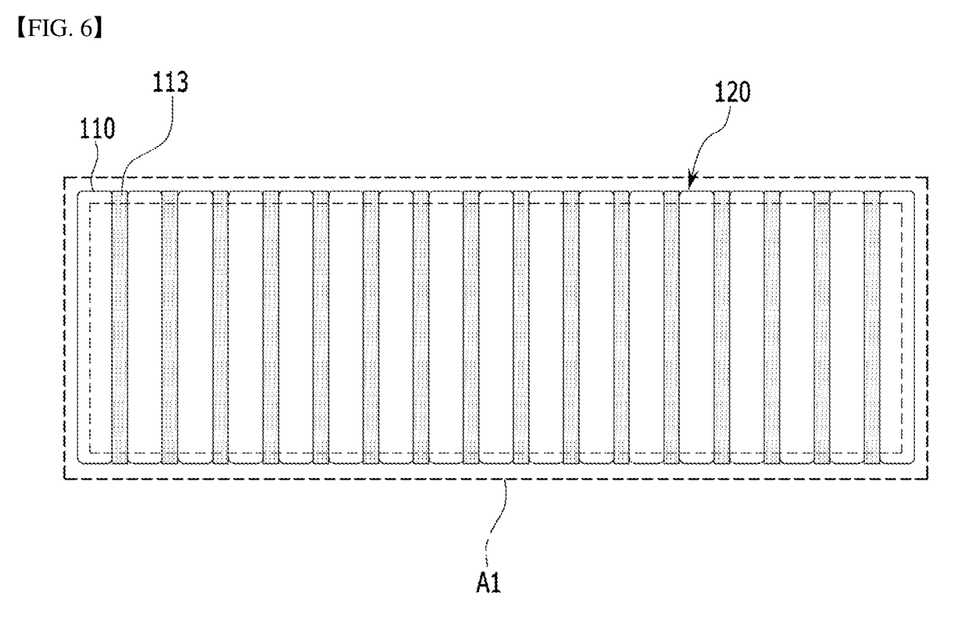
FIG. 6 is a cross-sectional view taken along the cutting line B-B of FIG. 5.

FIG. 4 is an exploded perspective view of a battery module according to an embodiment of the present disclosure. FIG. 5 is a perspective view showing a state in which the components constituting the battery module of FIG. 4 are combined. FIG. 6 is a cross-sectional view taken along the cutting line B-B of FIG. 5.

Referring to FIGS. 4 and 5, the battery module 100 according to one embodiment of the resent embodiment includes a battery cell stack 120 that is stacked in a first direction (y-axis), bus bars 130 located at the front surface and the rear surface of the battery cell stack 120, respectively, and fixing members 300 located at both end portions of the battery cell stack 120.

Referring to FIGS. 4 and 5, the battery module 100 according to the present embodiment may include a first area in which at least a part of the outer surface of the battery cell stack 120 is exposed. Such first area may be an area (A1) in which the upper and lower surfaces and both side surfaces of the battery cell stack 120 are exposed, except for an area in which the fixing member 300 is located in the battery cell stack 120, as shown in FIG. 6. That is, referring to FIGS. 5 and 6, the first area A1 may be an area where the battery cell stack 120 is exposed without a module frame in the battery module 100. That is, as the battery module 100 according to the present embodiment includes the first area A1, it may have a moduleless structure in which the battery cell stack 120 is exposed without a module frame.

Therefore, the battery module 100 according to the present embodiment includes the first area A1 and thus, can have a simplified and lightweight structure due to the elimination of a module frame as compared with a conventional battery module. Further, the battery module 100 according to the present embodiment can increase the density of the battery cells of the battery cell stack due to the elimination of the module frame, thereby further improving the performance of the battery module 100.

Referring to FIG. 4, the battery module 100 according to the present embodiment may include a cooling fin 113 that is located between at least two battery cells 110 adjacent to each other among the plurality of battery cells 110 included in the battery cell stack 120. As an example, the cooling fin 113 may be a plate material of aluminum. However, the cooling fin 113 is not limited to an aluminum material, and can be used without limitation as long as it is a metal material having a high thermal conductivity. Therefore, the cooling fin 113 corresponds to a lightweight material and thus, the battery module 100 of the present embodiment may improve the cooling performance of the battery cell 110 without an issue of weight increase.

Further, the battery module 100 may further include at least one adhesive layer 115 between the battery cell 110 and the cooling fin 113. Thereby, both side surfaces of the cooling fins 113 may be fixed between at least two battery cells 110 adjacent to each other. As an example, the adhesive layer 115 may be formed by an adhesive member such as a double-sided tape or an adhesive. However, the adhesive layer 115 is not limited to the above-mentioned contents, and can be used without limitation as long as it is a material having adhesive properties capable of fixing the battery cell 110 and the cooling fin 113 to each other. Thereby, in the battery module 100 of the present embodiment, the battery cell 110 and the cooling fin 113 can be adhered to each other with the adhesive layer 115 and thus, the rigidity and energy density of the battery cell stack 120 in the first direction (y-axis) can be enhanced.

The adhesive layer 115 according to the present embodiment may include at least one stripe-shaped adhesive portion. As shown in FIG. 4, the two adhesive portions may extend long in parallel with each other. The adhesive portion may extend long in a direction perpendicular to a direction in which the battery cell stack 120 is stacked.

Further, referring to FIGS. 4 and 5, fixing members 300 located at both end portions of the battery cell stack 120 may surround four surfaces of the battery cell stack 120. The fixing member 300 may be arranged along the end portion of the battery cell 110 spaced apart from the adhesive layer 115. As an example, the fixing member 300 may be an elastic member such as a holding band, but is not limited thereto. Thereby, the fixing member 300 may prevent the phenomenon of being relatively pushed between the plurality of battery cells 110 of the battery cell stack 120. In addition, the fixing member 300 may assist in adhering the battery cell 110 and the cooling fin 113 to each other.

Figure 7:
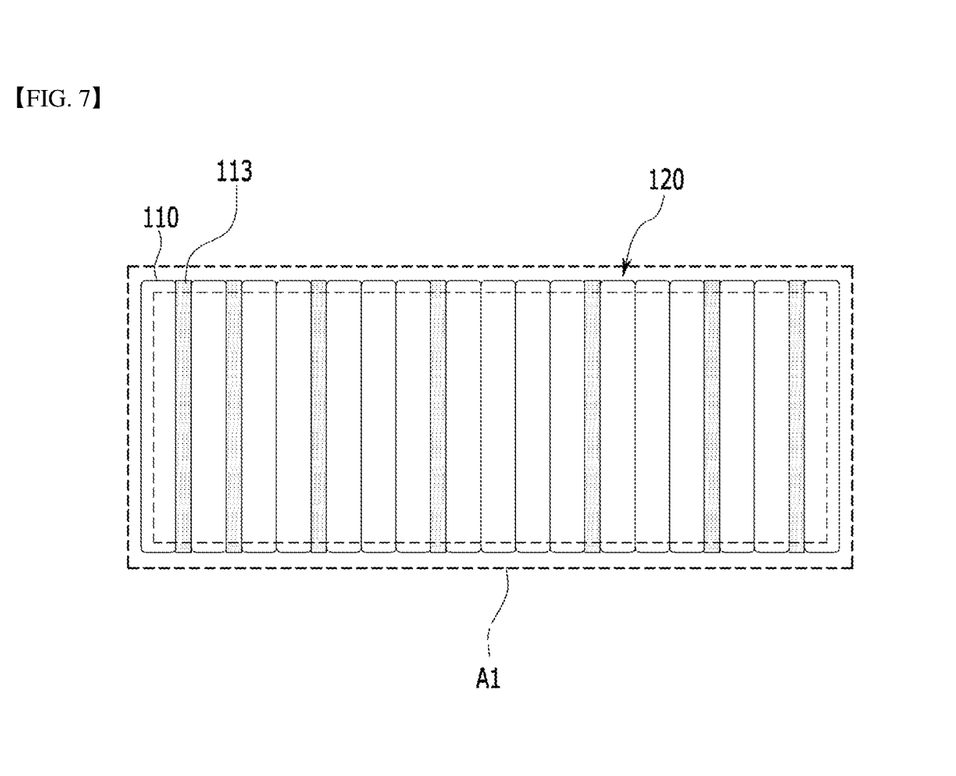
FIG. 7 is a cross-sectional view taken along the cutting line B-B of FIG. 5 according to another embodiment of the present disclosure.

FIG. 7 is a cross-sectional view taken along the cutting line B-B of FIG. 5 according to another embodiment of the present disclosure.

Referring again to FIGS. 5 and 6, in the battery module 100 according to the present embodiment, the cooling fins 113 may be located between mutually adjacent battery cells 110 that are arranged at regular intervals among the plurality of battery cells 110 of the battery cell stack 120. Further, the cooling fins 113 may be located between the battery cells 110 adjacent to each other among the plurality of battery cells 110 of the battery cell stack 120. Referring to FIG. 3, the conventional battery module 10 is configured such that heat generated from the battery cells 110 is transferred to the lower portion of the battery cells 110, and then transferred to the outside through the thermally conductive resin layer 310 and the bottom portion of the module frame 30. In contrast, the battery module 100 according to the present embodiment is configured such that heat generated from the battery cells 110 is directly transferred to the cooling fins 113, and as will be described later, the heat of the cooling fins 113 and/or the battery cells 110 can be immediately transferred to the thermally conductive resin layer 1315 formed on the lower pack housing 1300 of FIG. 8. Therefore, the battery module 100 in the present embodiment can more efficiently and quickly transfer heat generated from the battery cells 110 to the outside. In addition, the cooling deviation depending on the position of the battery cell 110 may be reduced.

Referring to FIGS. 5 and 7, in the battery module 100 of the present embodiment, many more cooling fins 113 may be arranged toward the outermost side as compared with the central portion of the battery cell stack 120. That is, the density of the cooling fins 113 formed in the outer peripheral portion of the battery cell stack 120 may be higher than the density of the cooling fins 113 formed in the central portion of the battery cell stack 120. Referring to FIG. 3, in the conventional battery module 10, as the position of the battery cell 110 is closer to the central portion compared to the outermost portion, heat transfer is performed well and thus, the cooling deviation occurs. In contrast, in the battery module 100 of the present embodiment, as the cooling fins 113 are located in consideration of the position of the battery cells 110, the cooling deviations depending on the position of the battery cells 110 may be further reduced. Further, in consideration of the position of the battery cells 110, the cooling fins 113 may not be located between the battery cells 110 adjacent to each other and thus, the energy density of the battery cell stack 120 may be further improved.

Figure 8:
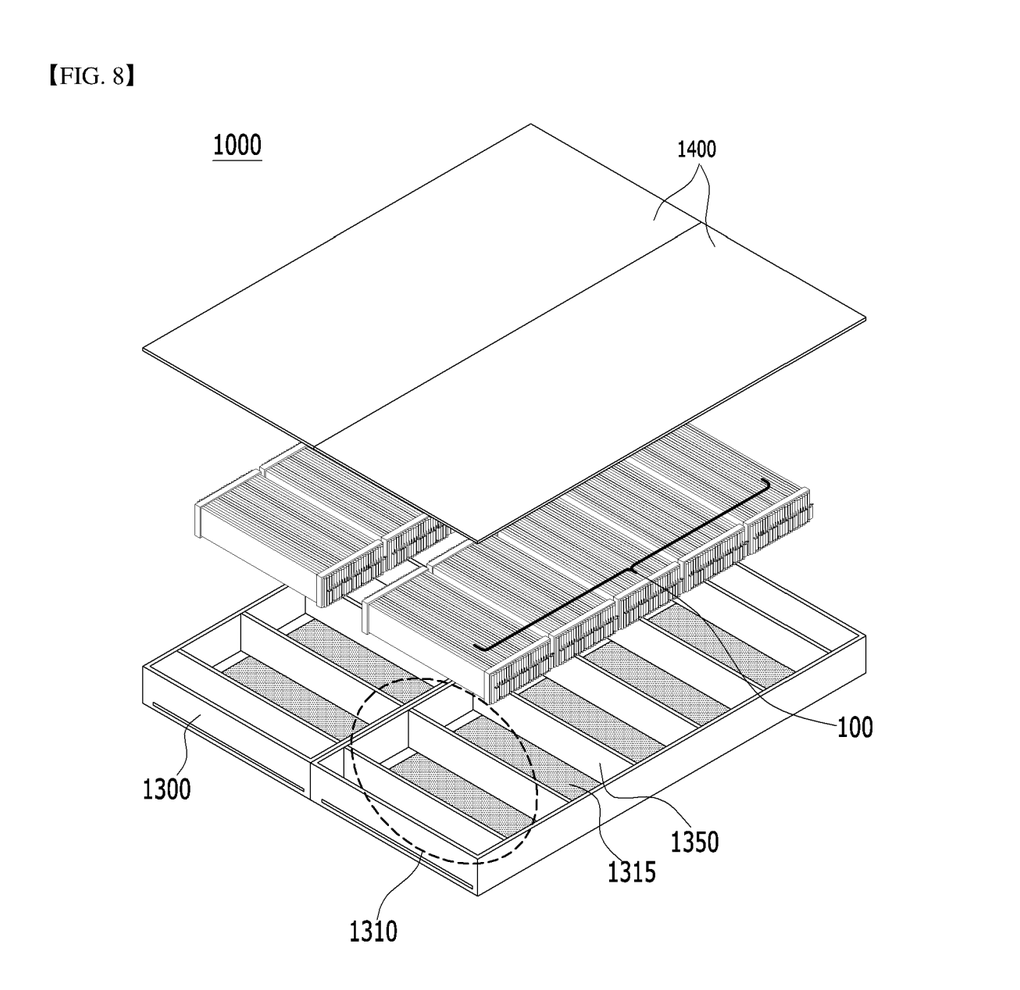
FIG. 8 is a perspective view illustrating a state before the battery module of FIG. 5 is coupled to a pack housing.
Figure 9:
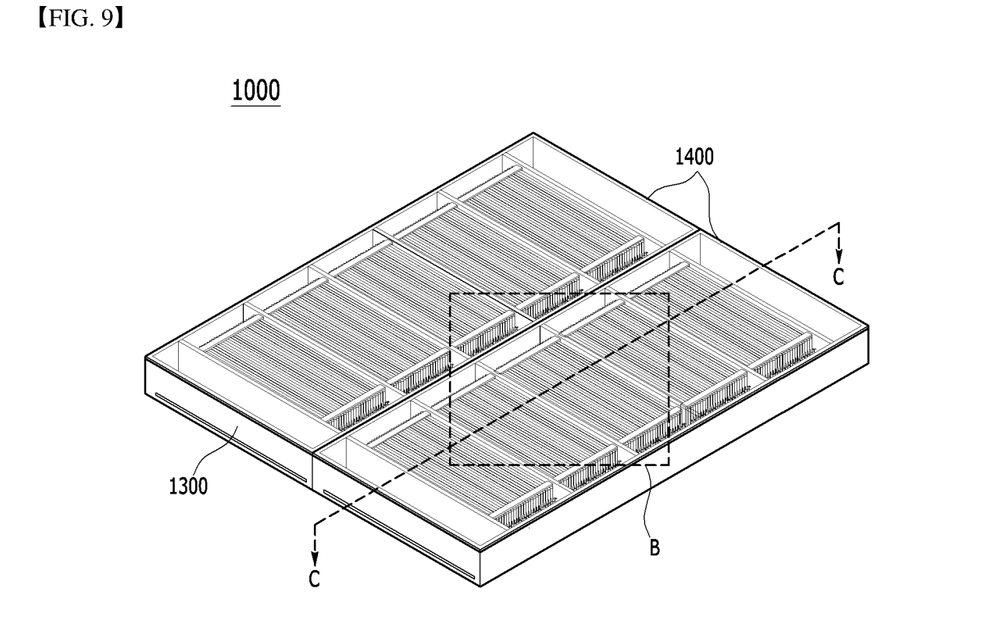
FIG. 9 is a perspective view illustrating a state in which the battery module of FIG. 5 is coupled to a pack housing.
Figure 10:
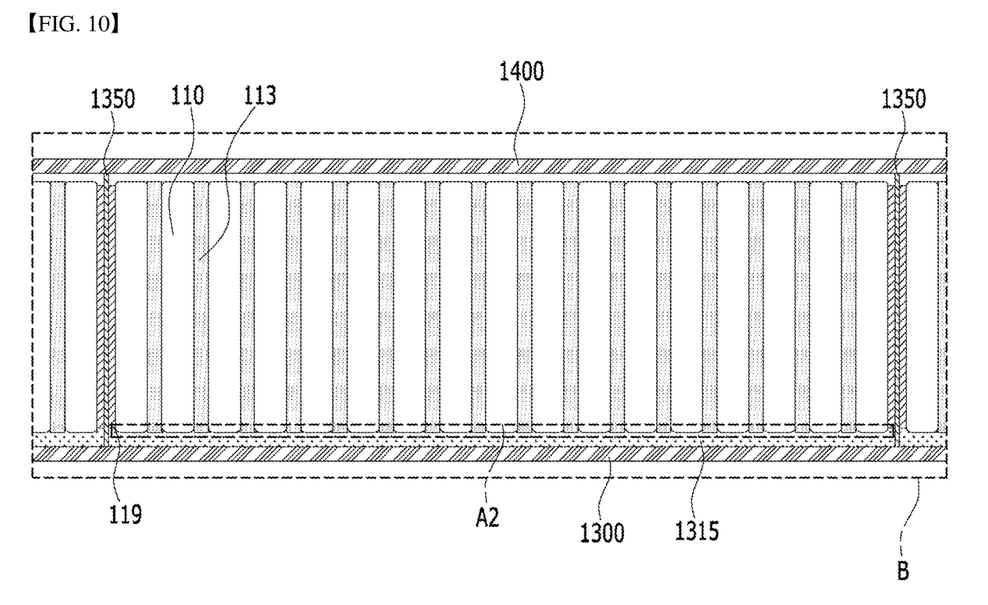
FIG. 10 is a cross-sectional view of area B of FIG. 9 taken along the cutting line C-C.

FIG. 8 is a perspective view illustrating a state before the battery module of FIG. 5 is coupled to a pack housing. FIG. 9 is a perspective view illustrating a state in which the battery module of FIG. 5 is coupled to a pack housing. FIG. 10 is a cross-sectional view of area B of FIG. 9 taken along the cutting line C-C.

Referring to FIGS. 8 and 9, the battery pack 1000 according to this embodiment includes a lower pack housing 1300 including a plurality of module regions 1310 in which a plurality of battery modules 100 are respectively mounted, and an upper pack housing 1400 that covers the upper portion of the plurality of module regions 1310.

In the lower pack housing 1300 of the battery pack 1000 according to the present embodiment, the module region 1310 may have a size corresponding to the size of the battery module 100. Further, a plurality of partition walls 1350 may be located between the plurality of module regions 1310, and among the battery cells 110 included in the battery cell stack 120 of the battery module 100, the outermost surface of the battery cell 110 and the partition wall 1350 may face each other. Therefore, the partition wall 1350 can protect the battery module 100 from external impact while dividing the area in which the battery module 100 is mounted.

Further, referring to FIG. 10, a side plate 119 may be included between the battery module 100 and the partition wall 1350. As described in FIGS. 6 and 7, the side plate 119 may face a side surface of the outermost battery cell 110 in the first area A1 where the battery cell stack 120 is exposed. The side plate 119 may be attached to at least one of the side surface of the outermost battery cell 110 and the partition wall 1350 in the battery cell stack 120. As an example, the side plate may be a plate manufactured by an injection method, or a plate made of a rubber material, but is not limited thereto. Thereby, the side plate 120 may additionally prevent damage to the battery module 100.

Referring to FIGS. 8 and 10, in the lower pack housing 1300 of the battery pack 1000 according to the present embodiment, a thermally conductive resin layer 1315 may be located in each of the module regions 1310. The thermally conductive resin layer 1315 may be formed by applying a thermally conductive resin to the module region 1310 of the lower pack housing 1300 and curing the thermally conductive resin.

As described in FIGS. 6 and 7, in the first area A1 where the battery cell stack 120 is exposed, at least a part of the lower end portion of the battery cell 110 and the lower end portion of the cooling fin 113 may directly face the thermally conductive resin layer 1315. In addition, an area in contact with the thermally conductive resin layer 1315 in the first area A1 may be a second area in which the lower surface of the battery cell stack 120 is exposed.

In the battery pack 1000 according to the present embodiment, the battery module 100 can be mounted in the module region 1310 before the thermally conductive resin for forming the thermally conductive resin layer 1315 is cured. In the battery pack 1000, the end portion of the cooling fin 113, the lower surface of the battery cell stack 120 and the thermally conductive resin layer 1315 may be in close contact with each other. The end portion of the cooling fin 113 and the lower surface of the battery cell stack 120 may face the thermally conductive resin layer 1315. Referring to FIG. 8, the direction (z-axis) in which the end portion of the cooling fin 113 and the lower surface of the battery cell stack 120 face the thermally conductive resin layer 1315 may be mutually perpendicular to the direction (x-axis) in which the battery cells 110 are stacked. In addition, as the thermally conductive resin of the thermally conductive resin layer 1315 is cured, the end portion of the cooling fin 113 and the second area A2 may be fixed to the thermally conductive resin layer 1315 formed on the lower pack housing 1300 of the battery pack 1000.

Further, referring to FIG. 3, the conventional battery module 10 is cooled as heat generated from the battery cells 110 is transferred in the order of the battery cell 110, the thermally conductive resin layer 310, the lower frame 30, and the heat sink (not shown). In this case, as the lower frame 30 is located between the thermally conductive resin layer 310 and the heat sink (not shown), the lower frame 30 may prevent heat generated from the battery cells 110 from being transferred to the outside. In contrast, in the battery pack 1000 of this embodiment, the lower portion of the battery cells 110 is in contact with the thermally conductive resin layer 1315 and thus, heat generated from the battery cells 110 of the battery module 100 may be directly transferred to the thermally conductive resin layer 1315. Thereby, the battery pack 1000 of the present embodiment can quickly transfer the heat generated from the battery cell 110 to the inside and the outside as compared with the conventional one.

In addition to the above, in the battery pack 1000 of the present embodiment, when the battery module 100 includes the cooling fins 113 between the battery cells 110 adjacent to each other, heat generated from the battery cell 110 of the battery module 100 can be immediately transferred from the inside to the cooling fin 113, and then directly transferred to the thermally conductive resin layer 1315 in contact with the cooling fins 113. Thereby, the battery pack 1000 of the present embodiment can more efficiently and quickly transfer heat generated from the battery cells 110 to the inside and the outside. In addition, the cooling deviation depending on the position of the battery cell 110 may be reduced.

Figure 11:
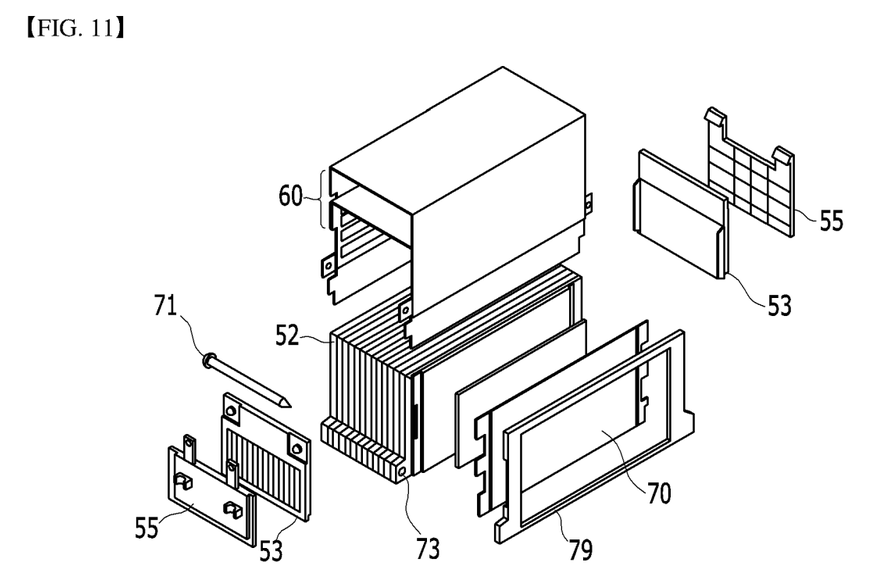
FIG. 11 is an exploded perspective view of a battery module according to a comparative example.

FIG. 11 is an exploded perspective view of a battery module according to a comparative example. Referring to FIG. 11, the conventional battery module 50 includes a battery cell stack 52 in which a plurality of battery cells are stacked, a module frame 60 for housing the battery cell stack 52, end plates 55 for covering the front and rear surfaces of the battery cell stack 52, and busbar frames 53 formed between the end plates 55 and the front and rear surfaces of the battery cell stack 52. Further, the conventional battery module 50 includes a cooling fin 70 in contact with the side surface of the battery cell stack 52, and further includes a fixing bolt 71, a fixing hole 73, and a fixing frame 79 for fixing the cooling fin 70 to the battery module 50. Therefore, the conventional battery module 50 may transfer heat generated in the battery cell stack 52 to the outside of the battery module 50 through the cooling fins 70.

However, in the case of the conventional battery module 50, an attempt was made to improve the cooling performance by including the cooling fins 70 in the battery module 50 as in this embodiment, but the capacity of the battery cell cannot be secured as much as the space occupied by the fixing bolt 71, the fixing hole 73, and the fixing frame 79 for fixing the cooling fin 70 to the battery module 50, which causes a problem that the capacity competitiveness per volume and the price competitiveness due to additional components are lowered.

In contrast, referring to FIGS. 4 to 10, the battery pack 1000 of the present embodiment includes the cooling fins 113 between the battery cells 110 adjacent to each other among the plurality of battery cells 110 of the battery cell stack 120 in the battery module 100, and thereby, can be fixed inside the battery cell stack 120 without a fixing structure (fixing bolt 71, fixing hole 73, fixing frame 79) as in the conventional battery module 50. Accordingly, the embodiment of the present disclosure can improve the cooling performance of the battery module 100 in a time- and cost-effective manner through a relatively simplified process.

Meanwhile, the battery pack according to the embodiment of the present disclosure can applied to various devices. These devices may be applied to transportation means such as an electric bicycle, an electric vehicle, a hybrid vehicle, but the present disclosure is not limited thereto, but the present disclosure is not limited thereto and can be applied to various devices that can use the battery module and the battery pack including the same, which also belongs to the scope of the present disclosure.

Although the preferred embodiments of the present disclosure have been described in detail above, the scope of the present disclosure is not limited thereto, and various modifications and improvements of those skilled in the art using the basic concepts of the present disclosure defined in the following claims also belong to the scope of rights.

DESCRIPTION OF REFERENCE NUMERALS

100: battery module
110: battery cell

113: cooling fin
115: adhesive layer
120: battery cell stack
300: fixing member
1000: battery pack

What is claimed is:

1. A battery pack, comprising:
a lower pack housing;
a battery cell stack located on the lower pack housing;
a wall located at an end portion of the battery cell stack;
thermally conductive resin positioned at a lower side of the battery cell stack; and
an upper pack housing for covering the battery cell stack,
wherein the battery cell stack includes a plurality of battery cells, and battery cells of the plurality of battery cells contact thermally conductive resin,
wherein a side plate is attached to a side surface of the battery cell stack and to the wall, wherein the side plate includes an elastic material, and wherein the side plate is located between the battery cell stack and the wall in a stacking direction of the battery cell stack,
wherein the battery cell stack includes a plurality of plate shaped cooling members, and a plate shaped cooling member of the plurality of plate shaped cooling members is located between two adjacent battery cells of the plurality of battery cells,
wherein an end portion of the plate shaped cooling member contacts the thermally conductive resin, and
wherein the battery cell stack includes an adhesive layer between a side of the plate shaped cooling member and one of the adjacent battery cells.

2. The battery pack according to claim 1,
wherein an upper surface, a lower surface, and side surfaces of the battery cell stack include exposed areas, and
wherein an exposed area of the lower surface of the battery cell stack faces thermally conductive resin, and a direction in which the lower surface of the battery cell stack faces thermally conductive resin and a direction in which the battery cells are stacked are perpendicular to each other.

3. The battery pack according to claim 1,
wherein the end portion of the plate shaped cooling member is fixed to the thermally conductive resin.

4. The battery pack according to claim 1,
wherein the plate shaped cooling member includes aluminum.

5. The battery pack according to claim 1,
wherein the end portion of the plate shaped cooling member contacts an upper surface of the thermally conductive resin.

6. The battery pack according to claim 1,
wherein at least one of the two adjacent battery cells is located between the plate shaped cooling member and an adjacent plate shaped cooling member of the plurality of plate shaped cooling members.

7. The battery pack according to claim 1,
wherein plate shaped cooling member density towards an outer portion of the battery cell stack is higher than plate shaped cooling member density towards a central portion of the battery cell stack.

8. The battery pack according to claim 1,
wherein the plurality of plate shaped cooling members includes a cooling fin.

9. The battery pack according to claim 1,
wherein the plurality of plate shaped cooling members includes a planar cooling member.

10. The battery cell stack according to claim 1,
wherein the plate shaped cooling member includes aluminum.

11. The battery pack according to claim 1, wherein the side plate is made of rubber.

12. The battery pack according to claim 1, wherein the battery cell stack is without a module frame.

13. A device comprising the battery pack according to claim 1.

14. An electric vehicle comprising the battery pack according to claim 1.

15. The battery pack according to claim 1, wherein the wall is one of a plurality of walls and the side plate is one of a pair of side plates, each side plate being located between an outermost battery of the battery cell stack and an adjacent wall of the plurality of walls in the stacking direction of the battery cell stack.

16. The battery pack according to claim 1, wherein two fixing members extend between the battery cell stack and the upper pack housing.

17. The battery pack according to claim 16, wherein the two fixing members each extend over the battery cell stack in the stacking direction and are located at opposite ends of the battery cell stack.

18. The battery pack according to claim 17, wherein the two fixing members each extend entirely over the battery cell stack in the stacking direction.

19. The battery pack according to claim 1, wherein there is no portion of a module frame between the battery cell stack and an outer wall of the lower pack housing.

20. The battery pack according to claim 1, wherein there is no portion of a module frame between the wall and the battery cell stack.

21. The battery pack according to claim 1, wherein the adhesive layer includes double-sided tape.

22. A battery pack, comprising:
a lower pack housing;
a battery cell stack located on the lower pack housing;
a wall located at an end portion of the battery cell stack;
thermally conductive resin positioned at a lower side of the battery cell stack; and
an upper pack housing for covering the battery cell stack,
wherein the battery cell stack includes a plurality of battery cells, and battery cells of the plurality of battery cells contact thermally conductive resin,
wherein a side plate is attached to a side surface of the battery cell stack and to the wall, wherein the side plate includes an elastic material, wherein the side plate is parallel to a length direction of an outermost battery cell of the battery cell stack,
wherein the battery cell stack includes a plurality of plate shaped cooling members, and a plate shaped cooling member of the plurality of plate shaped cooling members is located between two adjacent battery cells of the plurality of battery cells,
wherein an end portion of the plate shaped cooling member contacts the thermally conductive resin, and
wherein the battery cell stack includes an adhesive layer between a side of the plate shaped cooling member and one of the adjacent battery cells.

23. The battery pack according to claim 22, wherein two fixing members extend between the battery cell stack and the upper pack housing, and
wherein the two fixing members each extend over the battery cell stack in the stacking direction and are located at opposite ends of the battery cell stack.

24. The battery pack according to claim 22, wherein there is no portion of a module frame between the wall and the battery cell stack.

25. The battery pack according to claim 22, wherein the adhesive layer includes double-sided tape.

* * * * *